(12) United States Patent
Maiman et al.

(10) Patent No.: US 12,033,014 B2
(45) Date of Patent: Jul. 9, 2024

(54) TRANSACTION CARD INCLUDING A SECURITY COVER

(71) Applicant: Capital One Services, LLC, McLean, VA (US)

(72) Inventors: Tyler Maiman, Melville, NY (US); Jude Pierre Anasta, Hudson, NY (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/823,682

(22) Filed: Aug. 31, 2022

(65) Prior Publication Data

US 2024/0070423 A1  Feb. 29, 2024

(51) Int. Cl.
*G06K 19/06* (2006.01)
*G06Q 20/34* (2012.01)

(52) U.S. Cl.
CPC ..... *G06K 19/06196* (2013.01); *G06Q 20/341* (2013.01)

(58) Field of Classification Search
CPC .................................................. G06K 19/06196
USPC ......................................................... 235/449
See application file for complete search history.

(56) References Cited

U.S. PATENT DOCUMENTS

| 5,503,434 | A | 4/1996 | Gunn |
| 5,710,421 | A * | 1/1998 | Kokubu ............... G06K 19/077 235/492 |
| 7,918,391 | B2 | 4/2011 | Clegg et al. |
| 8,678,288 | B2 | 3/2014 | Eng |
| 9,743,733 | B2 | 8/2017 | Husbands |
| 9,984,595 | B2 | 5/2018 | Snow et al. |
| 2004/0089724 | A1* | 5/2004 | Lasch .................. A45C 11/321 235/487 |
| 2012/0200077 | A1 | 8/2012 | Pohlman |
| 2013/0200606 | A1* | 8/2013 | Omar ..................... B42D 15/00 283/74 |
| 2014/0262852 | A1 | 9/2014 | Gourdine |
| 2015/0007466 | A1* | 1/2015 | Van Wagoner ........ B42D 1/006 156/289 |
| 2017/0202327 | A1 | 7/2017 | Watkins |

* cited by examiner

*Primary Examiner* — Rafferty D Kelly
(74) *Attorney, Agent, or Firm* — Bookoff McAndrews, PLLC

(57) ABSTRACT

Transaction cards having a security cover to selectively obscure transaction information and related methods are disclosed. A transaction card may include a card body having a first layer and a second layer secured to each other, and a cover portion pivotably movable relative to the second layer about a cover rotation axis coplanar with the first layer via a hinge portion, wherein, when in an obfuscation orientation, the cover portion is coplanar with the first layer such that one or more elements of transaction information is obfuscated when viewing the transaction card.

20 Claims, 6 Drawing Sheets

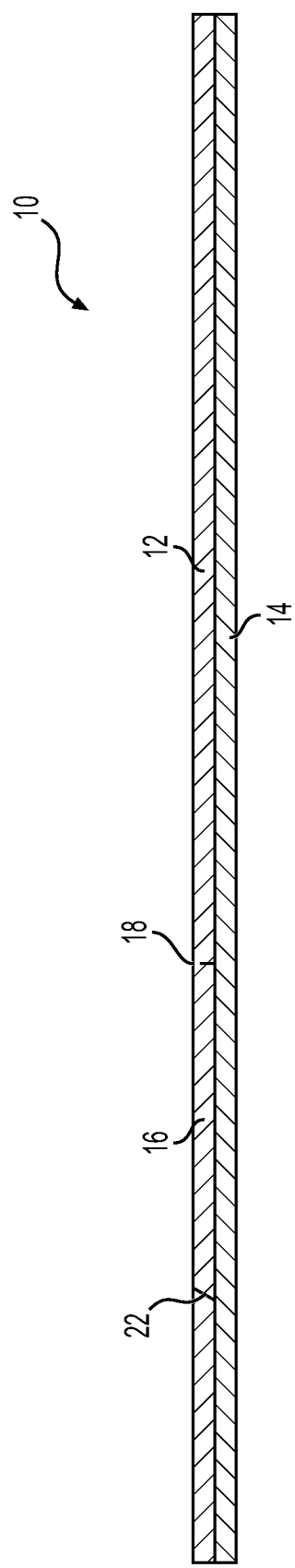
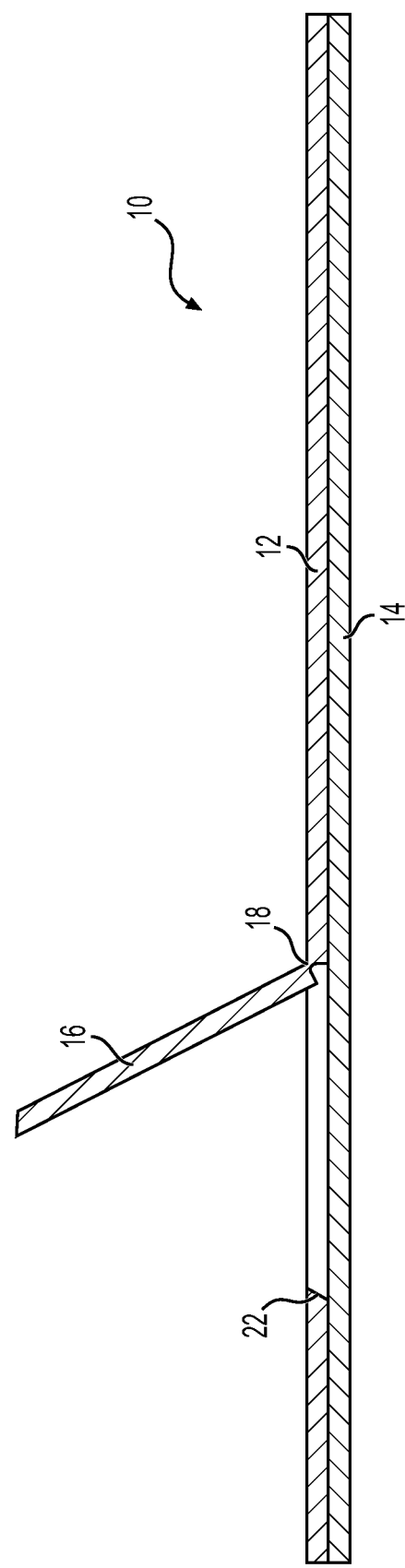

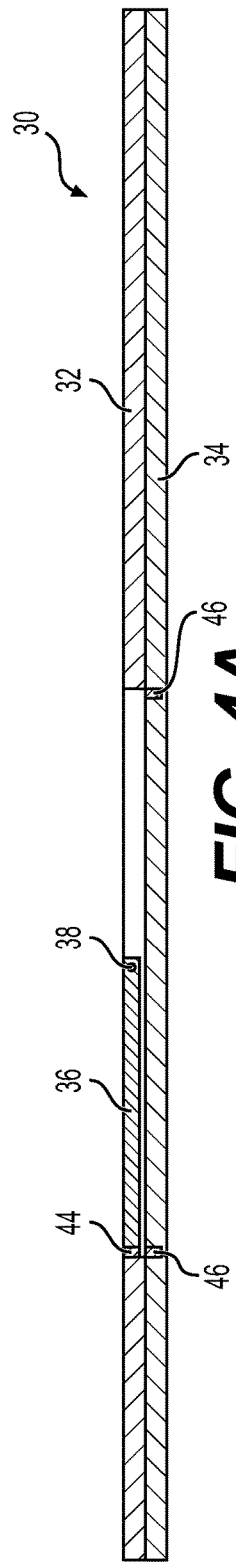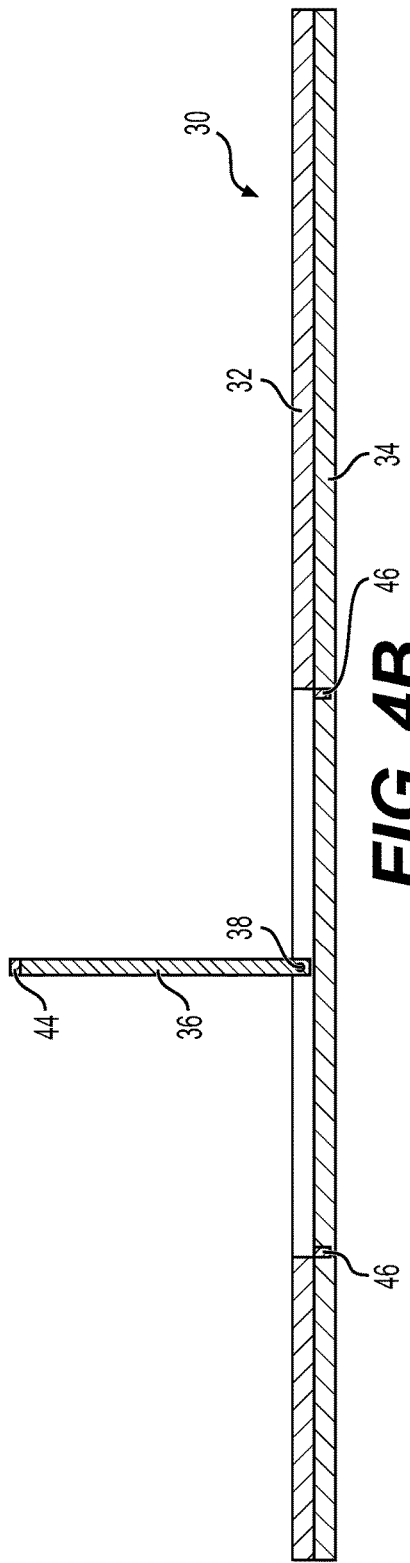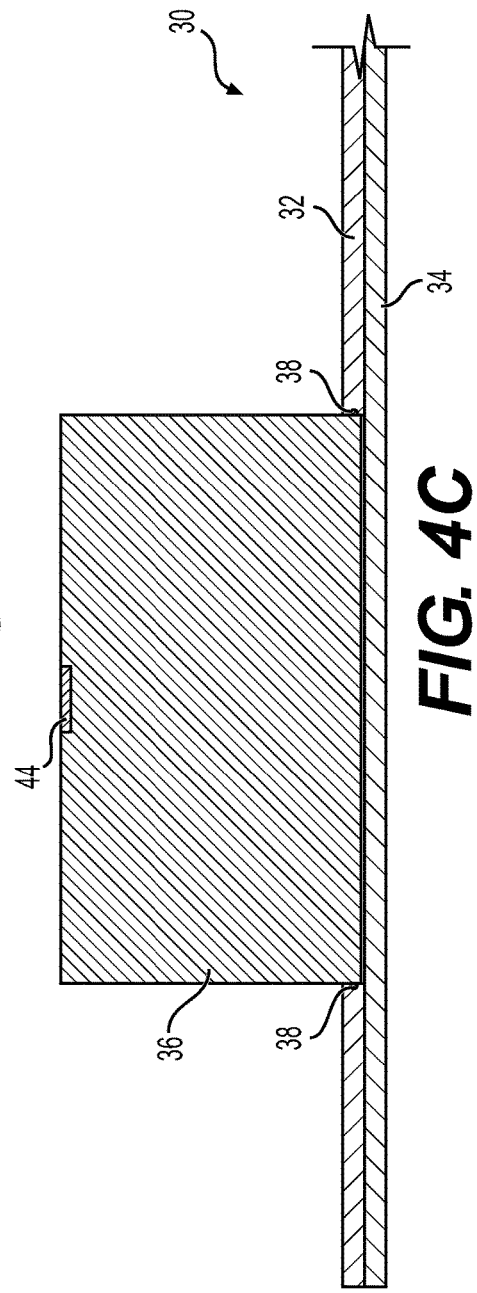

TRANSACTION CARD INCLUDING A SECURITY COVER

TECHNICAL FIELD

Various embodiments of the present disclosure relate generally to payment or other transaction cards and, more particularly, to transaction cards having a security cover to selectively obscure transaction information.

BACKGROUND

While the implementation of security measures in payment card transactions has improved security in many ways, the visible elements of transaction information on a payment card may still pose a security threat in the event they are seen by an unauthorized person. For example, even a card that includes security measures such as an EMV chip may display visible information such as the card number, expiration date, and card verification value (CVV). For some methods of transacting, these numbers are sufficient to authorize a transaction, and other methods of transaction may only require one additional piece of information, such as a card holder's zip code or phone number. While the visible elements of transaction or account information may be obscured prior to use, it is often necessary to have the card in view for some period of time, for example, during a transaction.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, payment or other transaction cards having a security cover to selectively obscure or reveal transaction information and related methods are disclosed. The disclosed cards may provide a card holder with additional security by limiting the amount of transaction information visible to others on the surface of the card.

For instance, a transaction card may include a card body having a first layer and a second layer secured to each other, and a cover portion pivotably movable relative to the second layer about a cover rotation axis coplanar with the first layer via a hinge portion, wherein, when in an obfuscation orientation, the cover portion is coplanar with the first layer such that one or more elements of transaction information is obfuscated when viewing the transaction card.

A method may include providing a cover layer including a cover portion and securing the cover layer to a base layer to form a card body. Wherein the provided cover portion is pivotably movable relative to the base layer about a cover rotation axis coplanar with the cover layer via a hinge portion, and wherein, when in an obfuscation orientation, the cover portion is coplanar with the cover layer such that one or more elements of transaction information is obfuscated when viewing the transaction card.

According to the disclosure, a card can include a card body having a first layer and a second layer adhered to each other, wherein one or more elements of transaction information are located on a surface of the second layer adjacent to the first layer; and a cover portion pivotably movable relative to the second layer about a cover rotation axis coplanar with the first layer via a living hinge that extends along the cover rotation axis and connects the cover portion to the first layer. Wherein the cover portion is pivotable between a closed position in which the cover portion covers the one or more elements of transaction information so as to conceal the one or more elements of transaction information, and an open position in which the one or more elements of transaction information are visible.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A and 2B depict cross sectioned views of the exemplary card of FIGS. 1A and 1B, taken along line A-A, when the card is in an obfuscation orientation or a closed position and when it is not in an obfuscation orientation or is in an open position, respectively, according to one or more embodiments of the present disclosure.

FIGS. 4A and 4B depict cross sectioned views of the exemplary card of FIGS. 3A and 3B, taken along line B-B, when the card is in an obfuscation orientation and when it is not in an obfuscation orientation (i.e., an open position), respectively, and FIG. 4C depicts a cross sectioned view of the exemplary card of FIGS. 3A and 3B, taken along line C-C, when it is not in an obfuscation orientation, according to one or more embodiments of the present disclosure.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to payment or other transaction cards and, more particularly, to payment or transaction cards having a security cover to selectively obscure or reveal transaction information and related methods. Cards according to the present disclosure may provide additional security from cameras or unauthorized individuals seeking to view and use visible payment information from one or more surfaces of a credit card. During regular in-person use, information, such as the CVV, may not be necessary to complete the transaction, though it may still be exposed and visible to onlookers. By providing a security cover to obscure or conceal some or all of the visible transaction information, cardholders can prevent information often needed for remote or online use from being seen during in-person transactions. In accordance with the present disclosure, the information provided with a payment or transaction card can remain printed on the card, but some or all of the security information may require an extra step, for example, opening a security cover, to be viewed.

Figure 1A:
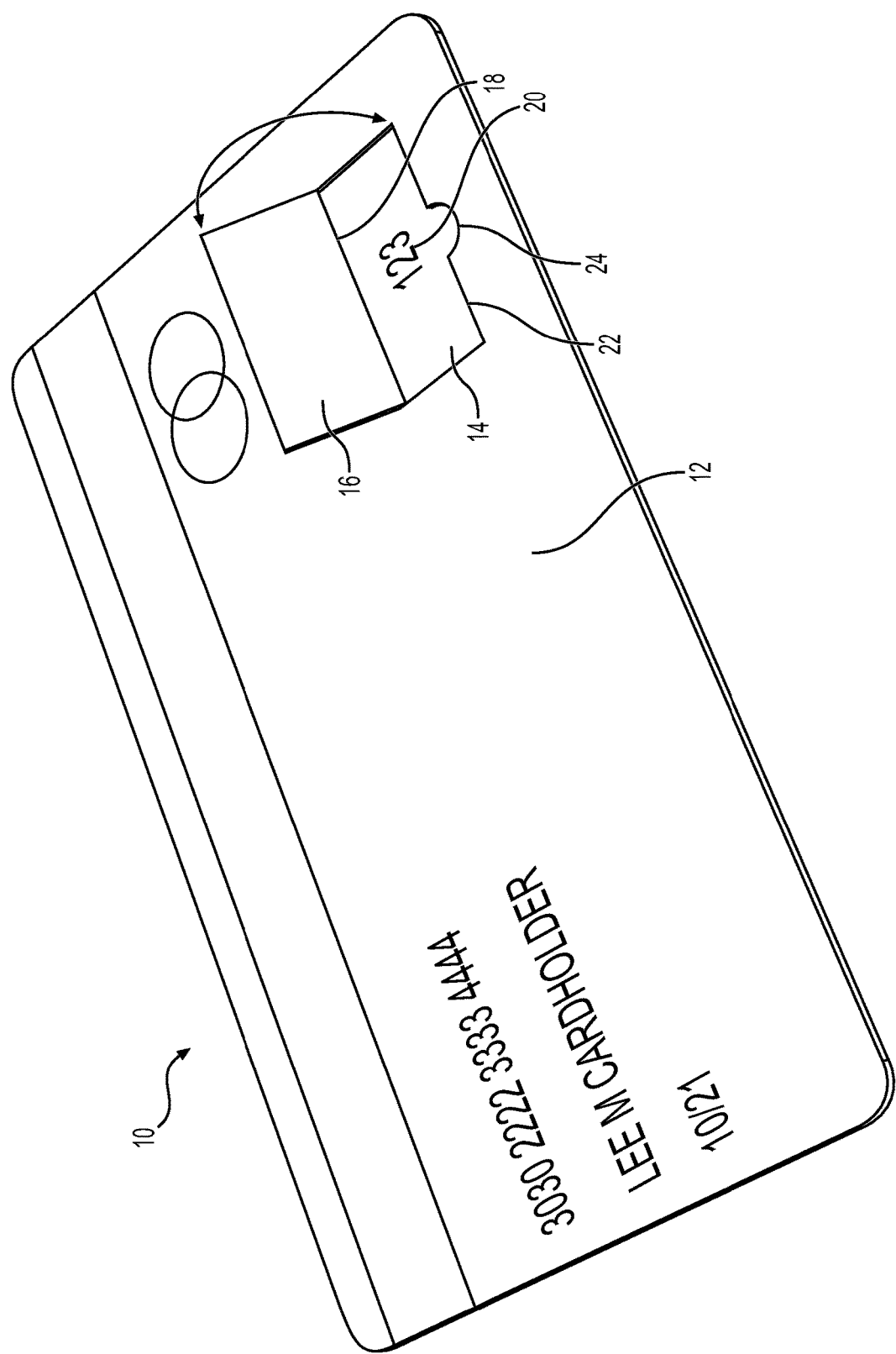
FIGS. 1A and 1B depict perspective and lateral elevation views, respectively, of an exemplary card, according to one or more embodiments of the present disclosure.
Figure 1B:
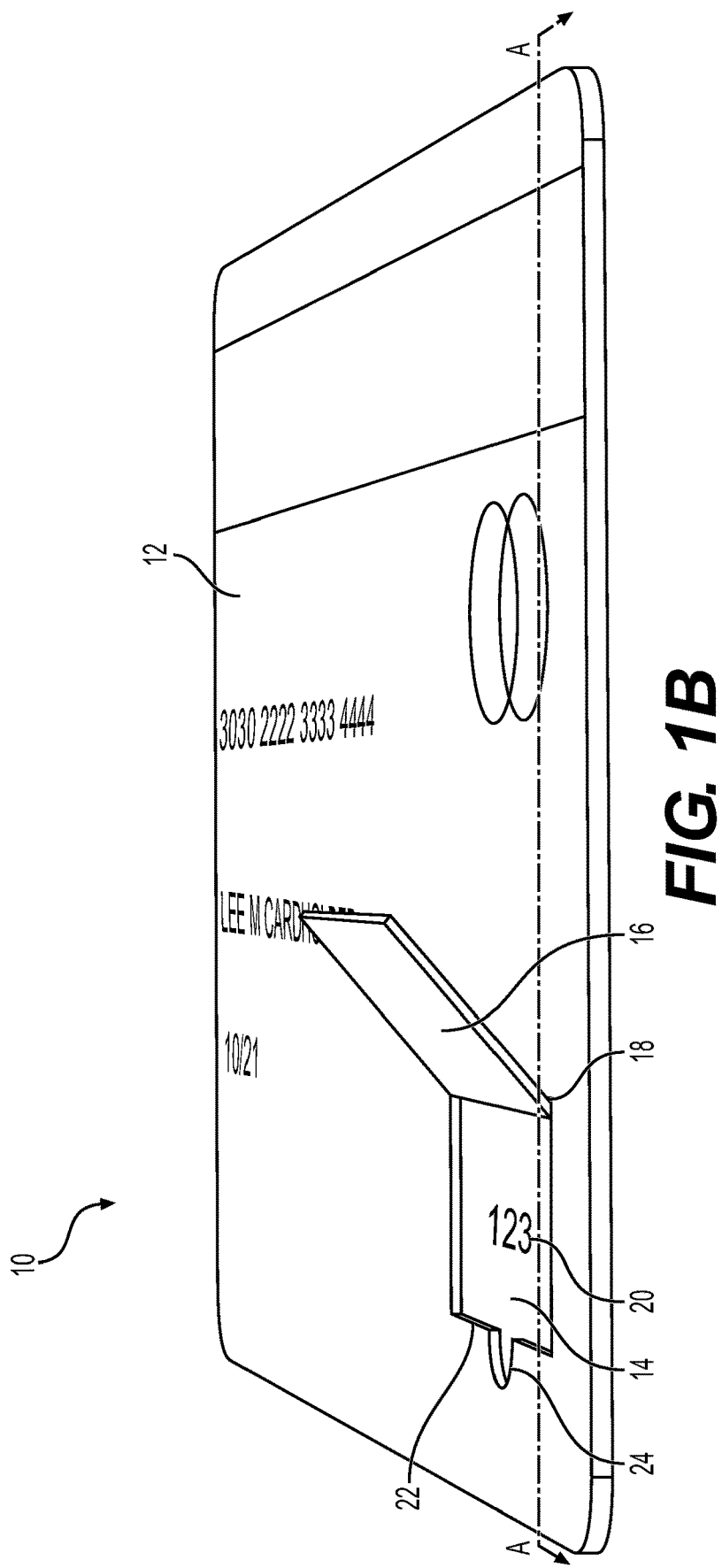

FIGS. 1A and 1B depict an exemplary transaction card 10, according to one or more embodiments of the present disclosure. As illustrated, transaction card 10 may include a cover layer 12 and a base layer 14, with cover layer 12 including a cover portion 16 for obscuring information. In some embodiments, cover portion 16 may be integral with, for example, cover layer 12. In other words, in some embodiments, cover portion 16 may be monolithically formed with cover layer 12 as a one-piece construction. Cover portion 16 may be a portion of cover layer 12, and may be movable relative to the remainder of cover layer 12 via a hinge portion 18. In other embodiments, cover portion 16 may be formed as a separate piece from cover layer 12 and connected thereto via hinge portion 18.

Hinge portion 18 may be of any suitable hinge type, such as a living hinge, pinned hinge, taped hinge, or the like. The type of hinge used may impact the processes by which card 10 can be manufactured, with living hinges potentially allowing for no additional components or assembly, and pinned hinges allowing a potentially larger range of motion without fatiguing the hinge. For example, a living hinge may be created by providing an indentation or scoring that extends along hinge portion 18 of cover portion 16, rather than a clean cut that may be provided about the other three edges of cover portion 16. This method could leave enough material to keep cover portion 16 pivotally attached to the remainder of cover layer 12.

In taped hinge embodiments, cover portion 16 may be secured with a piece of tape (or other adhesive) on an underside or top thereof to allow cover portion 16 to pivot about the hinge without fully separating from the card. Other types of hinges may also be employed, for example, in applications where enhanced durability may be needed. In some embodiments, the axis about which cover portion 16 rotates or pivots may be parallel to a longitudinal edge of the card body so that unintentional movement of cover portion 16 during use may be reduced.

Base layer 14 may be secured to cover layer 12 via, for example, an adhesive or welding process. Base layer 14 may be substantially continuous underneath cover layer 12 and cover portion 16, and may thereby provide a surface onto which elements of transaction information 20 may be located. Examples of transaction information 20 may include CVVs, card expiration dates, PINs, all or portions of a card identification number, other information a cardholder may have reason to protect from unauthorized third parties, or any combination thereof. In some embodiments, in lieu of or in addition to being provided on a surface of base layer 14 facing the cover portion 16, transaction information 20 may be provided on an underside of cover portion 16 (e.g., a side of cover portion 16 facing base layer 14). In either event, transaction information 20 may be obscured when cover portion 16 is in an orientation such that cover portion 16 is coplanar with cover layer 12.

In some embodiments, one or more retention mechanisms may be employed to retain cover portion 16 in its obfuscation orientation. For example, cover portion 16 may be separated from cover layer 12, at a side opposite hinge portion 18, by cutting into cover layer 12 at an angle. By including an angle at the junction between cover layer 12 and cover portion 16, cover layer 12 may be provided with a retention edge 22. Retention edge 22 may serve to catch, contact, and/or overlap a small portion of cover portion 16 when in an obfuscation orientation. As such, retention edge 22 may retain cover portion 16 in the obfuscation orientation until sufficient force (e.g., lifting or separating force) is applied to overcome the retention force (e.g., the force between retention edge 22 and cover portion 16 when in the obfuscation orientation). Further, one or more gaps or recesses 24 may be included in cover layer 12, adjacent to cover portion 16, as will be described in further detail below. In some embodiments, the hinge itself may, on its own or in combination with other retention mechanisms, provide a biasing force to retain cover portion 16 in its obfuscation orientation.

FIGS. 2A and 2B depict cross sectioned views of the exemplary card of FIGS. 1A and 1B, taken along line A-A, when the card is in an obfuscation orientation or a closed position (FIG. 2A) and when it is not in an obfuscation orientation or is in an open position (FIG. 2B), according to one or more embodiments of the present disclosure. In order to open cover portion 16, it may be moved (e.g., pried) past retention edge 22 (e.g., by overcoming the retention force between retention edge 22 and cover portion 16), and cover portion 16 may be closed by pushing it down past retention edge 22. In order to aid a cardholder in opening and closing cover portion 16, one or more gaps or recesses 24 may be included in cover layer 12, adjacent to cover portion 16. In some embodiments, recess 24 may be sized and shaped to allow a finger or other implement of the cardholder to lift cover portion 16 past retention edge 22, and away from base layer 14.

In some embodiments, prior to being opened for the first time, cover portion 16 may be retained in the obfuscation orientation by a frangible attachment between cover portion 16 and the rest of cover layer 12. In order to open cover portion 16 for the first time, such as upon receipt of a new card, the frangible attachment can be fractured or broken. Similar to the manner in which a living hinge would be created, via a partial cutting of cover layer 12, frangible attachment may be formed by separating cover portion 16 from retention edge 22 most of the way, but leaving just enough material to require additional force to break. In some embodiments, the frangible attachment may be perforated or only present along certain portions of the edge of cover portion 16. For example, perforations and or scoring may be provided at intervals along the three edges of cover portion 16 (i.e., not the hinge side), or may be provided along an entire edge, such as the edge opposite and parallel to hinge 18.

Figure 3A:
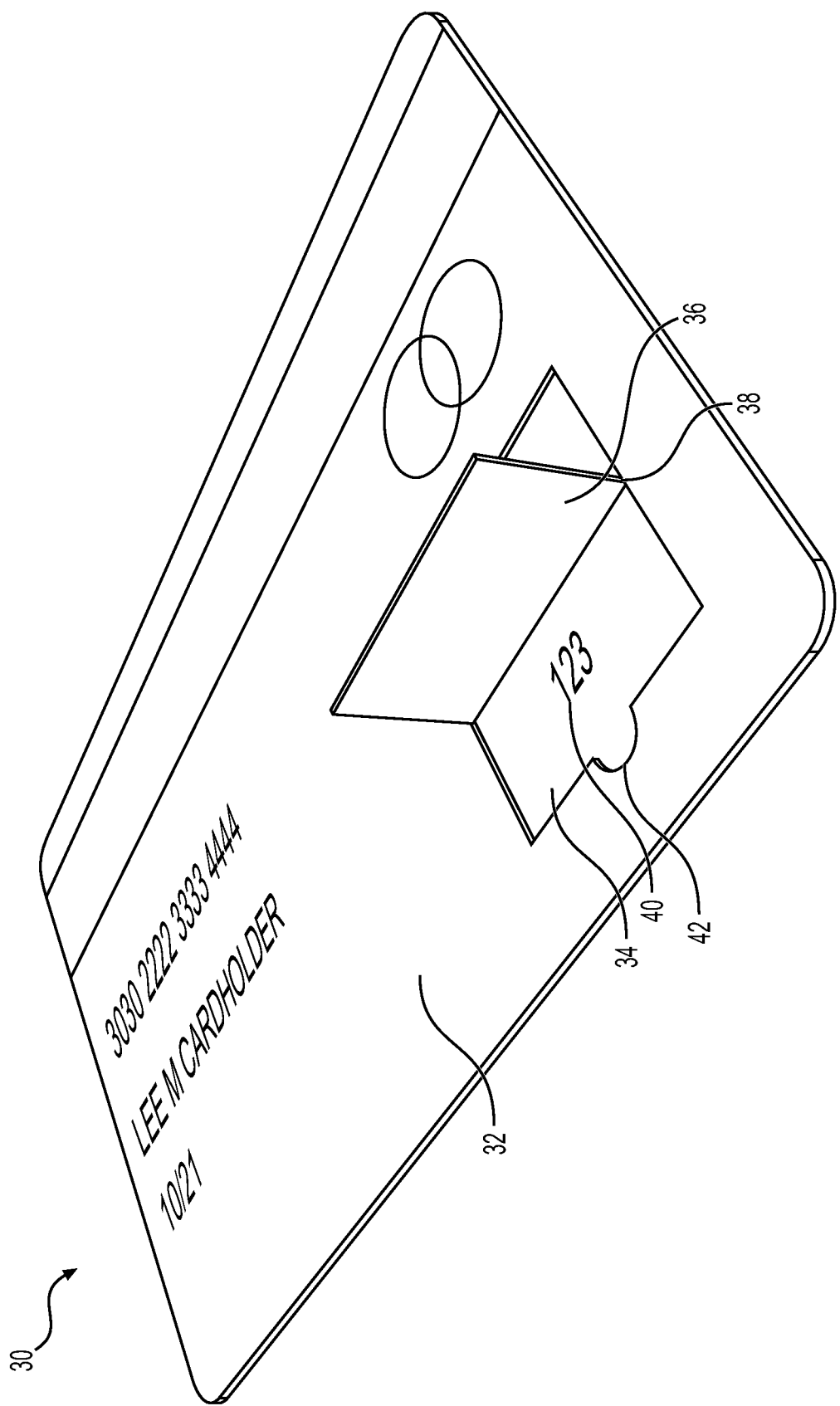
FIGS. 3A and 3B depict perspective and lateral elevation views, respectively, of a second embodiment of an exemplary card, according to one or more embodiments of the present disclosure.
Figure 3B:
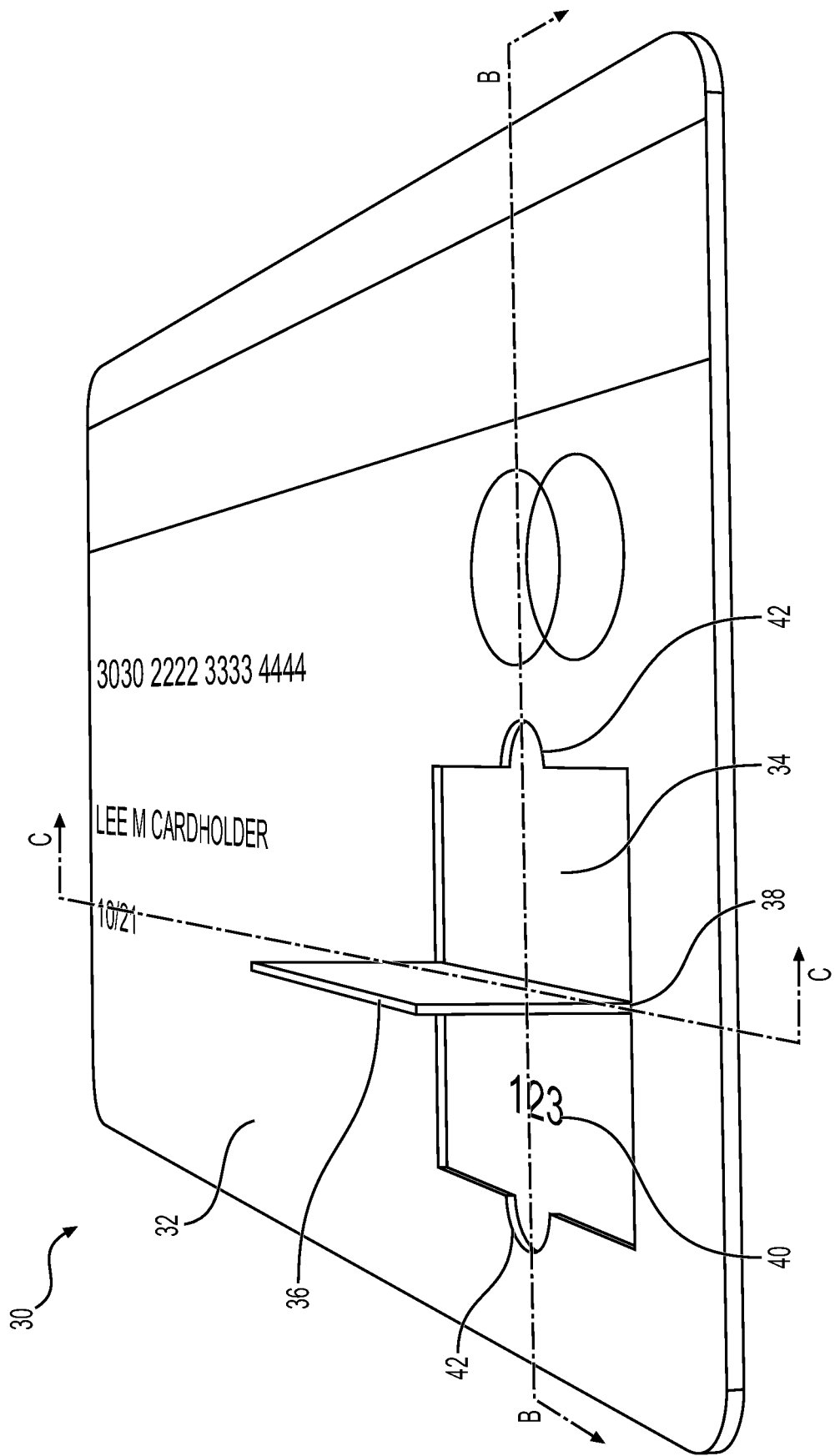

Perspective and lateral elevation views of another embodiment, card 30, are depicted in FIGS. 3A and 3B, respectively, according to one or more embodiments of the present disclosure. Card 30 may include a cover layer 32 and a base layer 34, with cover layer 32 being pivotally connected to a cover portion 36 for selectively obscuring transaction information 40. In some embodiments, cover portion 36 may be a separate component, installed into cover layer 32. Cover portion 36 may be sized to fit into a window (e.g., an opening or cut out) in cover layer 32, and may be connected to cover layer 32 via one or more hinge portions 38.

As discussed above, hinge portions 38 may be of any suitable hinge type, and the type of hinge used may impact the processes by which card 30 can be manufactured. As illustrated in FIGS. 3A-3B and 4A-4C, a type of pinned hinge may be employed to allow a large range of motion, for example, 180 degrees. For example, a pinned hinge may be created by providing a pair of extensions (e.g., protrusions, posts, etc.) from cover portion 36 in a direction collinear with the desired axis of rotation, along with a corresponding pair of recesses in the cover layer 32 into which the extensions can be inserted. Alternatively, one or both of the recesses may be provided in cover portion 36, with the corresponding extension or extensions protruding from cover layer 32. The resulting hinge portion 38 may constrain cover portion 36 to moving within the plane of cover layer 32, while defining an axis about which cover portion 36 can rotate.

As discussed with card 10, base layer 34 may be secured to cover layer 32 via, for example, an adhesive or welding process. Base layer 34 may be substantially continuous underneath cover layer 32, and may thereby provide a surface or surfaces onto which elements of transaction information 40 may be located. In lieu of or in addition to being provided on a surface of base layer 34 facing cover portion 36, transaction information 40 may be provided on a side of cover portion 36 (e.g., a side of cover portion 36 facing base layer 34). In some embodiments, at least some transaction information 40 may be obscured when cover portion 36 is positioned to be coplanar with cover layer 32, and there may be multiple coplanar arrangements that may obscure different portions of base layer 34. For example, cover layer 32 may have a window or void on both sides of hinge portion 38 such that cover portion 36 can have two different planar orientations that are 180 degrees of cover portion 36 rotation away from one another. As such, card 30 may have one or more obfuscation orientations, with each covering different transaction information, and each exposing an opposite face of cover portion 36.

To retain cover portion 36 in a particular obfuscation orientation, one or more retention mechanisms may be employed. For example, cover portion 36 can include one or more retention components 44, for example, magnetic components, snaps, adhesives, or other latching mechanisms. Retention component(s) 44 may secure cover portion 36 in a planar orientation on its own, or by cooperating with one or more cover securing components 46, for example, magnetic components, snaps, adhesives, or other components designed to provide a biasing force to retention component(s) 44. In some embodiments, cover securing components 46 can be positioned on either side of the axis of rotation of cover portion 36 to allow cover portion 36 to be maintained in one of multiple possible orientations. Cover securing components 46 can be attached to, or integral with, base layer 34 and/or cover layer 32. According to one embodiment, engagement portions, such as either the cover securing components 46 or the retention components 44, may reside on an inner side of the base layer 34, wherein the cover securing components 46 features magnetic components, snaps, adhesives, or other latching mechanisms.

FIGS. 4A and 4B depict cross sectioned views of the exemplary card 30 of FIGS. 3A and 3B, taken along line B-B, when the card is in an obfuscation orientation or a closed position (FIG. 4A), or in an upright position not obscuring surfaces of base layer 34 (FIG. 4B). FIG. 4C depicts a cross sectioned view of card 30, taken along line C-C, when it is in the upright position also shown in FIG. 4B. In some embodiments, in order to open cover portion 36, it may be pried away from base layer 34 such that retention component 44 is separated from cover securing component 46. This separation may require sufficient force be applied to overcome, for example, a magnetic attraction and/or a latching force. Cover portion 16 may be closed by pushing or otherwise allowing an engagement portion of retention component 44 to move towards a reciprocal engagement portion of one of the cover securing components 46, until retention component 44 engages the desired cover securing component 46. In order to aid a cardholder in moving cover portion 36 away from base layer 34, one or more recesses 42 may be included in cover layer 12, adjacent either side of cover portion 36. In some embodiments, recess 42 may be sized and shaped to allow a finger or other implement of the cardholder to lift cover portion 36 away from base layer 14, towards an upright position or another obfuscation orientation.

Cards 10, 30 may be produced by any suitable methods, including a method that includes providing a cover layer including a cover portion, and securing the cover layer to a base layer to form a card body. The cover portion can be integral with, or attached to, the cover layer such that it is pivotably movable relative to the base layer about a cover rotation axis via a hinge portion. In one or more obfuscation orientations, the cover portion may be coplanar with the cover layer such that one or more portions of the base layer, which may include elements of transaction information, can be obfuscated when viewing the transaction card.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. In the following claims, any of the claimed embodiments can be used in any combination. For example, one or more retention mechanisms (e.g., retention edges, magnetic components, snaps, biased hinges, or other latching mechanisms) may be used in lieu of or in concert with one another.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A transaction card, comprising:
    a card body having a first layer and a second layer, the first and second layers being secured to each other; and
    a cover portion pivotably movable, between a first orientation and a second orientation, into and out of a plane of the first layer about a cover rotation axis via a hinge portion, the cover rotation axis being coplanar with the first layer; wherein:
    in the first orientation, the first orientation including an obfuscation orientation, the cover portion is coplanar with the first layer such that one or more elements of transaction information is obfuscated when viewing the transaction card, and
    in the second orientation, the second orientation including a viewing orientation, the cover portion is coplanar with the first layer such that the one or more elements of transaction information is visible when viewing the transaction card.

2. The transaction card of claim 1, wherein the hinge portion is a living hinge that extends along the cover rotation axis.

3. The transaction card of claim 1, wherein, in the obfuscation orientation, a first engagement portion of the cover portion contacts a second engagement portion of one of the first layer and the second layer so as to retain the cover portion in the obfuscation orientation.

4. The transaction card of claim 1, wherein the cover portion further includes a magnetic element, and wherein magnetic attraction between the magnetic element and the second layer retains the cover portion in the obfuscation orientation.

5. The transaction card of claim 1, wherein the cover portion is retained in the obfuscation orientation by a frangible attachment portion of the first layer that prevents the cover portion from pivoting until it is broken.

6. The transaction card of claim 1, wherein the one or more elements of transaction information are located on a surface of the second layer adjacent to the cover portion when the cover portion is in the obfuscation orientation.

7. The transaction card of claim 1, wherein the one or more elements of transaction information are located on a surface of the cover portion adjacent to the second layer when the cover portion is in the obfuscation orientation.

8. The transaction card of claim 1, wherein the hinge portion comprises:
    a pair of retention components that extend from the cover portion in a direction collinear with the cover rotation axis; and
    a pair of recesses in the first layer into which the retention components extend.

9. The transaction card of claim 8, wherein the cover portion is configured to rotate 180 degrees from the obfuscation orientation to a viewing orientation to selectively reveal a first portion of the second layer or a second portion of the second layer.

10. The transaction card of claim 1, further comprising a finger gap in the first layer adjacent to the cover portion.

11. The transaction card of claim 1, wherein the cover rotation axis is parallel to a longitudinal edge of the card body.

12. A method, comprising:
    providing a cover layer including a cover portion; and
    securing the cover layer to a base layer to form a card body;
    wherein the cover portion is pivotably movable, between a first orientation and a second orientation, into and out of a plane of the cover layer about a cover rotation axis via a hinge portion, wherein the cover rotation axis is coplanar with the cover layer; wherein:
    in the first orientation, the first orientation including an obfuscation orientation, the cover portion is coplanar with the cover layer such that one or more elements of transaction information is obfuscated when viewing the transaction card, and
    in the second orientation, the second orientation including a viewing orientation, the cover portion is coplanar with the first layer such that the one or more elements of transaction information is visible when viewing the transaction card.

13. The method of claim 12, wherein the hinge portion is a living hinge that extends along the cover rotation axis and connects the cover portion to the cover layer.

14. The method of claim 12, wherein providing the cover layer including the cover portion includes positioning a first edge of the cover portion in relation to a second edge of the cover layer, such that, in the obfuscation orientation, the first edge of the cover portion contacts the second edge of the cover layer to retain the cover portion in the obfuscation orientation.

15. The method of claim 12, wherein providing the cover layer including the cover portion or securing the cover layer to the base layer includes positioning a magnetic element of the cover portion in relation to either the base layer or the cover layer such that magnetic attraction between the magnetic element and the base layer or between the magnetic element and the cover layer retains the cover portion in the obfuscation orientation.

16. The method of claim 12, wherein the cover layer comprises a frangible attachment portion that connects the cover portion to the cover layer, the method further comprising:
    fracturing the frangible attachment portion so as to allow pivotal movement of the cover portion relative to the base layer.

17. The method of claim 12, wherein the hinge portion comprises:
- a pair of retention components that extend from the cover portion in a direction collinear with the cover rotation axis; and
- a pair of recesses in the cover layer into which the retention components extend.

18. The method of claim 12, wherein the cover layer comprises a finger gap adjacent the cover portion, and wherein applying a force to the cover portion adjacent the finger gap pivots the cover portion from the obfuscation orientation towards a viewing orientation.

19. A card, comprising:
- a card body having a first layer and a second layer, the first and second layers being adhered to each other, wherein one or more elements of transaction information are located on a surface of the second layer adjacent to the first layer; and
- a cover portion pivotably movable, between a first orientation and a second orientation, into and out of a plane of the first layer about a cover rotation axis coplanar with the first layer via a living hinge that extends along the cover rotation axis and connects the cover portion to the first layer; wherein:
- in the first orientation, the first orientation including an obfuscation orientation, the cover portion is coplanar with the first layer such that one or more elements of transaction information is obfuscated when viewing the transaction card, and
- in the second orientation, the second orientation including a viewing orientation, the cover portion is coplanar with the first layer such that the one or more elements of transaction information is visible when viewing the transaction card.

20. The card of claim 19, wherein, when in the first orientation, a first engagement portion of the cover portion contacts a second engagement portion of one of the second layer and the first layer so as to retain the cover portion in the first orientation.

\* \* \* \* \*